United States Patent
De et al.

(10) Patent No.: US 9,423,943 B2
(45) Date of Patent: Aug. 23, 2016

(54) AUTOMATIC VARIABLE ZOOMING SYSTEM FOR A PROJECT PLAN TIMELINE

(71) Applicant: Oracle International Corporation, Redwood Shores, CA (US)

(72) Inventors: Niladri De, Hyderabad (IN); Srinivasu Dudala, Hyderabad (IN); Mani Kumar Vran Kasibhatla, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 319 days.

(21) Appl. No.: 14/200,057

(22) Filed: Mar. 7, 2014

(65) Prior Publication Data

US 2015/0253967 A1 Sep. 10, 2015

(51) Int. Cl.
*G06F 3/00* (2006.01)
*G06F 3/0484* (2013.01)
*G06Q 10/06* (2012.01)

(52) U.S. Cl.
CPC .......... *G06F 3/04845* (2013.01); *G06F 3/0484* (2013.01); *G06F 3/04847* (2013.01); *G06Q 10/063* (2013.01); *G06Q 10/0631* (2013.01)

(58) Field of Classification Search
CPC .......................... G06F 3/04845; G06F 3/04847
USPC ....................................................... 715/771
See application file for complete search history.

(56) References Cited

U.S. PATENT DOCUMENTS

| | | | |
|---|---|---|---|
| 5,737,728 A | 4/1998 | Sisley et al. | |
| 5,745,110 A | 4/1998 | Ertemalp | |
| 6,211,856 B1 | 4/2001 | Choi et al. | |
| 6,707,903 B2 | 3/2004 | Qutub et al. | |
| 6,920,632 B2 | 7/2005 | Donovan et al. | |
| 7,092,929 B1 | 8/2006 | Dvorak et al. | |
| 7,406,432 B1 | 7/2008 | Motoyama | |
| 7,536,313 B2 | 5/2009 | Motoyama | |
| 7,688,322 B2 | 3/2010 | Kapler et al. | |

(Continued)

FOREIGN PATENT DOCUMENTS

| | | |
|---|---|---|
| EP | 1026609 A2 | 8/2000 |
| WO | 9416397 | 7/1994 |

(Continued)

OTHER PUBLICATIONS

Daniel D. Suthers, "An Analysis of Explanation and Its Implications for the Design of Explanation Planners", Computer Science, Feb. 1993, ftp://ftp.pitt.edu/dept/lrdc/edtech/suthers/suthers-thesis-full.pdf, last downloaded Mar. 5, 2014.

(Continued)

*Primary Examiner* — William Titcomb
(74) *Attorney, Agent, or Firm* — Miles & Stockbridge P.C.

(57) ABSTRACT

A system is provided that performs automatic variable zooming. The system displays a project plan timeline within a user interface, where a project plan timeline includes one or more tasks and a timeline includes one or more time units. The system further receives an instruction to invoke automatic variable zooming on the displayed project plan timeline. The system further receives a criteria. The system further calculates one or more scores for the one or more time units of the project plan timeline based on the criteria. The system further adjusts a zoom level for one or more portions of the project plan timeline based on the one or more calculated scores.

20 Claims, 8 Drawing Sheets

(56) References Cited

U.S. PATENT DOCUMENTS

| | | | |
|---|---|---|---|
| 7,912,746 | B2 | 3/2011 | Kline et al. |
| 7,921,026 | B2 | 4/2011 | O'Cull et al. |
| 8,099,312 | B2 | 1/2012 | Jin et al. |
| 8,160,911 | B2 | 4/2012 | Lau et al. |
| 8,286,103 | B2 | 10/2012 | Chaudhri et al. |
| 8,433,632 | B2 | 4/2013 | Sankaran et al. |
| 8,544,011 | B2 | 9/2013 | Tanikawa |
| 8,776,008 | B2 | 7/2014 | Kapoor et al. |
| 9,164,656 | B1* | 10/2015 | Keller ................. G06F 3/04817 |
| 2003/0038831 | A1 | 2/2003 | Engelfriet |
| 2003/0061266 | A1 | 3/2003 | Ouchi |
| 2005/0149370 | A1 | 7/2005 | Brown |
| 2005/0165631 | A1 | 7/2005 | Horvitz |
| 2005/0198103 | A1 | 9/2005 | Ching |
| 2006/0004618 | A1 | 1/2006 | Brixius |
| 2006/0085322 | A1* | 4/2006 | Crookshanks ......... G06Q 30/06 705/37 |
| 2007/0073575 | A1 | 3/2007 | Yomogida |
| 2007/0150327 | A1 | 6/2007 | Dromgold |
| 2007/0233534 | A1 | 10/2007 | Martin et al. |
| 2007/0245300 | A1 | 10/2007 | Chan et al. |
| 2008/0103871 | A1 | 5/2008 | Ruehl et al. |
| 2008/0126114 | A1 | 5/2008 | McClure |
| 2008/0155433 | A1 | 6/2008 | Robertson et al. |
| 2008/0221946 | A1 | 9/2008 | Balon |
| 2009/0006156 | A1* | 1/2009 | Hunt ...................... G06Q 30/02 705/7.11 |
| 2009/0018996 | A1* | 1/2009 | Hunt ...................... G06Q 30/02 |
| 2009/0133027 | A1 | 5/2009 | Gunning et al. |
| 2009/0198540 | A1 | 8/2009 | Kienzle et al. |
| 2009/0234699 | A1 | 9/2009 | Steinglass et al. |
| 2010/0010856 | A1 | 1/2010 | Chua et al. |
| 2011/0026898 | A1* | 2/2011 | Lussier ................ G11B 27/034 386/280 |
| 2011/0107256 | A1 | 5/2011 | Robertson et al. |
| 2011/0271220 | A1 | 11/2011 | Remsberg et al. |
| 2011/0283285 | A1 | 11/2011 | Saad et al. |
| 2012/0069131 | A1* | 3/2012 | Abelow ............... G06Q 10/067 348/14.01 |
| 2012/0130907 | A1 | 5/2012 | Thompson et al. |
| 2012/0278118 | A1 | 11/2012 | Araki et al. |
| 2013/0144679 | A1 | 6/2013 | Burnett et al. |
| 2013/0159198 | A1* | 6/2013 | Cartan ................... G06Q 10/06 705/301 |
| 2014/0122144 | A1* | 5/2014 | Cirpus .................. G06Q 10/06 705/7.14 |
| 2014/0193047 | A1* | 7/2014 | Grosz ................... G06F 3/1242 382/118 |
| 2014/0195921 | A1* | 7/2014 | Grosz ................... G06F 3/1242 715/738 |
| 2014/0222485 | A1* | 8/2014 | Cantor ............... G06Q 10/0633 705/7.22 |
| 2014/0244334 | A1 | 8/2014 | De et al. |

FOREIGN PATENT DOCUMENTS

| | | | |
|---|---|---|---|
| WO | 0118683 | A2 | 3/2001 |
| WO | 2004102431 | A1 | 11/2004 |
| WO | 2009055425 | A1 | 4/2009 |
| WO | 2012092556 | A2 | 7/2012 |
| WO | 2013100902 | A1 | 7/2013 |
| WO | 2013162572 | A1 | 10/2013 |

OTHER PUBLICATIONS

Charlotte Russe, "BOARD delivers Budgeting and Planning Applications for Charlotte Russe", http://www.board.com/downloads/1en_CharlotteRusse.pdf, last downloaded Mar. 5, 2014.

Constraints and Dependencies—Gantt Charts Online—Gantto.com, http://gantto.com/support/documentation/constraints-and-dependencies/?overlay=false, last downloaded Mar. 5, 2014.

Stephen Sloan et al., "CPM and GANTT: The Next Step in Multi-Project Management", http://www.nesug.org/Proceedings/nesug12/ma/ma07.pdf, last downloaded Mar. 5, 2014.

Distribute project work evenly (level resource assignments), http://office.microsoft.com/en-in/project-help/distribute-project-work-evenly-level-resource-assignments-HA001231647.aspx, last downloaded Mar. 5, 2014.

Agata Czarnigowska, "Earned value method as a tool for project control", Budownictwo i Architektura 3 (2008) 15-32, http://yadda.icm.edu.pl/baztech/element/bwmeta1.element.baztech-article-BPL6-0014-0070/c/httpwibis_pollub_plfilesplikikonferencje32.pdf, last downloaded Mar. 5, 2014.

Bonnie Biafore, "Fast-track tasks to shorten your project schedule—Project—Office.com", http://office.microsoft.com/en-in/project-help/fast-track-tasks-to-shorten-your-project-schedule-HA010036399.aspx, last downloaded Mar. 5, 2014.

Features: Task Management, Zilicus PM Project planing & collaboration software, http://www.zilicus.com/features/task-management.html, last downloaded Mar. 5, 2014.

Danny Holten, "Hierarchical Edge Bundles: Visualization of Adjacency Relations in Hierarchical Data", IEEE Transactions on Visualization and Computer Graphics, vol. 12, No. 5, Sep./Oct. 2006, http://www.win.tue.nl/~dholten/papers/bundles_infovis.pdf, last downloaded Mar. 5, 2014.

How to Create Project Schedule Part II, Elementool Project Management Blog, http://www.elementool.com/blog/?p=238, last downloaded Mar. 5, 2014.

Zhenhua Guo et al., "Improving Resource Utilization in MapReduce", School of Informatics and Computing, Indiana University, US, http://grids.ucs.indiana.edu/ptliupages/publications/Improve_Resource_Utilization_MapReduce_V8.pdf, last downloaded Mar. 5, 2014.

Microsoft Project—Project Management Features, http://office.microsoft.com/en-us/project/project-management-and-ppm-showcase-microsoft-project-FX103802304.aspx, last downloaded Mar. 5, 2014.

Microsoft Project—Project Portfolio Management Features, http://office.microsoft.com/en-us/project/project-management-and-ppm-showcase-microsoft-project-FX103802304.aspx, last downloaded Mar. 5, 2014.

Download Microsoft Project for the masses from Official Microsoft Download Centre, "Microsoft Project for the masses", http://www.microsoft.com/en-in/download/details.aspx?id=25194, last downloaded Mar. 5, 2014.

Project Management Software—Quick Tour, "MinuteMan Systems", http://www.minuteman-systems.com/QuickTour.htm, last downloaded Mar. 5, 2014.

Oracle Primavera, Oracle Data Sheet, "Oracle's Primavera P6 Enterprise Project Portfolio Management", Copyright 2013.

OmniPlan, version 2.0.1 Manual, http://downloads2.omnigroup.com/software/MacOSX/Manuals/OmniPlan-2-Manual.pdf, last downloaded Mar. 5, 2014.

Wolfgang Wahlster et al., "Plan-based Integration of Natural Language and Graphics Generation", Jan. 1993, http://scidok.sulb.uni-saarland.de/volltexte/2013/5011/pdf/RR_93_02_.pdf, last downloaded Mar. 5, 2014.

Top Down and Bottom Up Planning Project Management Tool Set, "PM Tool with Top Down Planning Design and Bottom Up Processing Strategic Approach", http://2-plan.com/free-project-management-software-2-plan-desktop/top-down-and-bottom-up-planning-project-management-tool-set.html, last downloaded Mar. 5, 2014.

Project Management Shortcuts: Resource Leveling Made Easy—Liquid Planner, http://www.liquidplanner.com/blog/project-management-shortcuts-resource-leveling-made-easy/, last downloaded Mar. 5, 2014.

RationalPlan Project Management Software—MultiProject Version, http://www.rationalplan.com/multi-project-management-software.php, last downloaded Mar. 5, 2014.

Scheduling Projects Reference 1, http://www.openxprocess.com/help/reference/scheduler/overview.html, last downloaded Mar. 5, 2014.

Scheduling Projects Reference 2, http://www.openxprocess.com/help/reference/scheduler/specify_tasks.html, last downloaded Mar. 5, 2014.

(56) References Cited

OTHER PUBLICATIONS

Andy Carmichael, Ph.D.,CEng, FBCS, "Planning by Priority, How to prioritize project tasks to maximize delivered business benefits", Ivis Technologies, Issue 2.0, Scheduling Projects Reference 3, http://www.openxprocess.com/whitepapers/Planning%20By%20Priority%20_04_.pdf, last downloaded Mar. 5, 2014.
Asana Guide, The path to doing great things, "Sorting & Filtering", https://asana.com/guide/projects/sorting, last downloaded Mar. 5, 2014.
TaskInsight 3.0 Task Manager Updates Timeline Graphics and Functionality, http://prmac.com/release-id-29274.htm, last downloaded Mar. 5, 2014.
Anant Shree Agrawal, "Task Prioritization Rules for Project Execution", (IJERA) ISSN: 2248-9622, vol. 2, Issue 4, Jul.-Aug. 2012, pp. 1208-1212, http://www.ijera.com/papers/Vol2_issue4/GT2412081212.pdf, last downloaded Mar. 5, 2014.
Time Management Software—Get Things Done with Achieve Planner Task Management, http://www.effexis.com/achieve/planner.htm, last downloaded Mar. 5, 2014.
Use top-down planning to create summary tasks (or phases)—Project—Office.com, http://office.microsoft.com/en-in/project-help/use-top-down-planning-to-create-summary-tasks-or-phases-HA010376809.aspx, last downloaded Mar. 5, 2014.
VMware Horizon Mirage Web Manager Guide, v4.2, Jun. 2013, http://www.vmware.com/pdf/mirage-web-manager-guide-42.pdf, last downloaded Mar. 5, 2014.
What is Project Management—Lean Kit, http://leankit.com/project-management/what-is-project-management/, last downloaded Mar. 5, 2014.
Workforce Scheduler, Employee Scheduling Software Saves Time and Money and Gets People Working, by Kronos www.kronos.com/Scheduling-Software/Employee-Scheduling-Software.aspx, last downloaded Mar. 5, 2014.
Niladri De et al., U.S. Appl. No. 14/200,054, filed Mar. 7, 2014.
Ragnar Bade et al., "Connecting time-oriented data and informatin to a coherent interactive visualization", Proceedings of the 2004 Conference on Human Factors in Computing Systems, CHI '04, Jan. 1, 2004, pp. 105-112, XP055138586.
Oracle, "Oracle RCUI Guidelines", Oracle ADF Rich Client User Interface Guidelines, Gantt Chart Usage Guideline, http://www.oracle.com/webfolder/ux/middleware/richclient/index.html?/webfolder/ux/middleware/richclient/guidelines5/gantt.html, last downloaded Jan. 15, 2015.
Opinion Center Li, "Microsoft Project", http://opinioncenter.li/microsoft-project!, last downloaded Jan. 15, 2015.
Seavus Project Viewer, "User Manual for Seavus Project Viewer 11", http://www.seavusprojectviewer.com/support/documents/, last visited on Jan. 22, 2015, 118 pages.

\* cited by examiner

AUTOMATIC VARIABLE ZOOMING SYSTEM FOR A PROJECT PLAN TIMELINE

FIELD

One embodiment is directed to a computer system, and more particularly, to a computer system that displays data.

BACKGROUND

Project managers or planners typically work with a project plan timeline, which is a set of tasks that are associated with an overall project or objective, and that are displayed over a timeline. A project plan timeline for a sophisticated project/objective will typically have numerous tasks over a significant duration, such as a year. However, a display area is limited in size. This generally means that: (1) only a portion of the entire project plan timeline can be displayed at a time; and (2) the entire project plan timeline can only be displayed at a zoom level where a majority of the content of the project plan timeline is not legible. However, a project planner may like to closely examine the project plan timeline for certain time periods (or "time units") without losing context or sight of the overall project plan timeline. For example, a user may wish to identify, in the project plan timeline, where a resource (e.g., "Matt") is overloaded. If the user zooms out to a view of the entire project plan timeline, the user likely cannot tell which tasks belong to Matt, and which tasks belong to other resources. However, if the user zooms into a more readable view, the user must navigate through the project plan timeline looking for tasks that belong to Matt.

SUMMARY

One embodiment is a system that provides automatic variable zooming. The system displays a project plan timeline within a user interface, where a project plan timeline includes one or more tasks and a timeline includes one or more time units. The system further receives an instruction to invoke automatic variable zooming on the displayed project plan timeline. The system further receives one or more criteria. The system further calculates one or more scores for the one or more time units of the project plan timeline based on the received criteria. The system further adjusts a zoom level for one or more portions of the project plan timeline based on the one or more calculated scores.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

According to an embodiment, an automatic variable zooming system is provided. The automatic variable zooming system can automatically calculate variable zoom calculation scores for visible time units of a project plan timeline, where a project plan timeline includes a set of tasks that are displayed over a timeline, and where the timeline includes a number of time units, such as days. The calculation of the variable zoom calculation scores for the visible time units of the project plan timeline can be based on a user-selected criteria that is selected out of all available pre-defined criteria offered by the automatic variable zooming system, or any custom-defined criteria created by the user. The calculated variable zoom calculation scores can be used by the automatic variable zooming system to set varying zoom levels for the corresponding time units of the project plan timeline, when the project plan timeline is displayed within a user interface of the automatic variable zooming system. A higher variable zoom calculation score can result in a higher zoom level.

Figure 1:
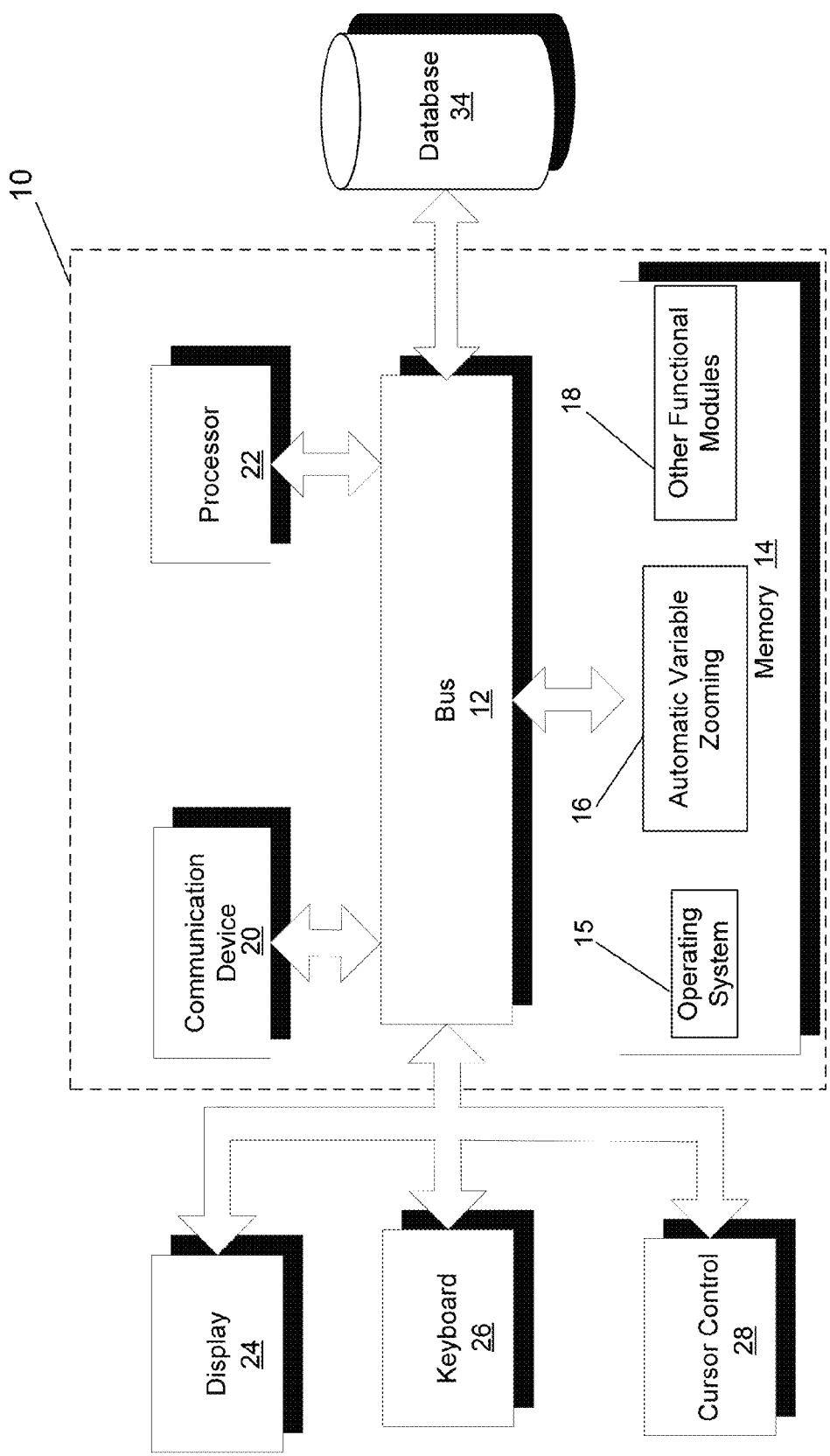
FIG. 1 illustrates a block diagram of a system that can implement an embodiment of the invention.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, an automatic variable zooming module 16, as well as other functional modules 18. Operating system 15 can provide an operating system functionality for system 10. Automatic variable zooming module 16 can provide functionality for automatic variable zooming. In certain embodiments, automatic variable zooming module 16 can comprise a plurality of modules, where each module provides specific individual functionality for automatic variable zooming. System 10 can also be part of a larger system. Thus, system 10 can include one or more additional functional modules 18 to include the additional functionality. For example, functional modules 18 may include modules that provide additional functionality, such as functionality of a "Primavera Enterprise Project Portfolio Management" by Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

As previously described, a project manager or planner typically needs to closely examine a project plan timeline for certain time periods (or "time units") without losing a view of the overall plan. A need for the project planner to closely examine the project plan timeline may be based on one or more of the following reasons (but not limited to the following reasons). The project planner may need to identify which time periods a set of important resources are over-allocated and re-plan one or more tasks for those resources at alternate time periods, or identify "double entries" (i.e., tasks assigned to the same resource for identical or overlapping time periods) that are entered by mistake and correct the double entries. While moving tasks or identifying double entries, the project planner will likely need to view an overall context of the project plan timeline and the tasks that surround the viewed portion of the project plan timeline. Further, the project planner may need to identify the time periods where a large number of tasks are finishing, because the project planner may discover potential task dependencies not marked, potential gaps between finishing tasks and starting tasks, potential overlap between two sequential tasks, etc. Again, while moving tasks around for correction, the project planner will likely need to view nearby tasks, and would likely need to view the overall context. In addition, the project planner may need to identify the time periods on which remaining portions of previously delayed tasks are being executed. This may be because the project planner wants to closely monitor the progress, and take immediate action if the progress is further delayed, to potentially avoid any disruptive ripple effects. In this situation, the project planner will also likely need to view surrounding tasks and an overall context in order to be conscious of any potential impact.

As also previously described, a size of a display area is limited, so, typically, only a certain portion of an entire project plan timeline is visible. If a user zooms out to have the entire project plan timeline viewed in the display area, the individual elements of the project plan timeline are typically too small in size to be legible, rendering the view cluttered and effectively useless. If, on the other hand, the user zooms into a specific portion of the project plan timeline, all other portions of the project plan timeline are no longer displayed within the display area, an overall context of the project plan timeline is lost, and the user is required to navigate back and forth within the project plan timeline in order to do any meaningful examination and take any remedial action.

Existing systems usually offer zooming features that allow a user to zoom in and zoom out. However, the zooming scale is uniform. As previously described, for uniform zooming, if a user zooms out, the display area typically becomes too crowded to be usable. But if the user zooms in, important contextual information can be lost, and the user typically has to perform a significant amount of back-and-forth navigation. Some existing systems try to solve this problem by using a filtered view, where the relevant content is displayed within the display area, and the rest of the content is hidden. While this renders the displayed view uncluttered even at low zoom levels, this also hides content, and essentially removes contextual information. Some other existing systems support variable zoom levels. However, the variable zoom levels are essentially manually done. This means that the user has to manually set different zoom levels for different time periods. But this requires the user to know which time periods to be zoomed into, and what zoom level should be set for each time period.

Further, some existing systems may support "hot-spot" marking. With "hot-spot" marking, if a user specifies filter criteria, instead of hiding the time periods of the project plan timeline which do not meet the filter criteria, the system can "mark" (or otherwise highlight) the time periods in which the filter criteria is met. The user can then zoom into the marked time periods. However, the problem remains that, as soon as the user zooms into a range of time periods, all the other areas of the project plan timeline go out of view, and the contextual information is lost. In addition, even assuming a system that supports both "hot-spot" marking and manual variable zooming, the user still has to manually zoom into a "hot-spot" time period. There may be many "hot-spot" time periods, and it will be very tedious to continuously zoom into a "hot-spot" time period, zoom out to the non-"hot-spot" time period in order to maintain a broader range of time periods in the view, zoom into another "hot-spot" time period, etc. Further, a user has no way of prioritizing the "hot-spot" time periods. Thus, as is described below in greater detail, an automatic variable zooming system that provides automatic variable zooming of a project plan timeline is highly desirable.

Figure 2:
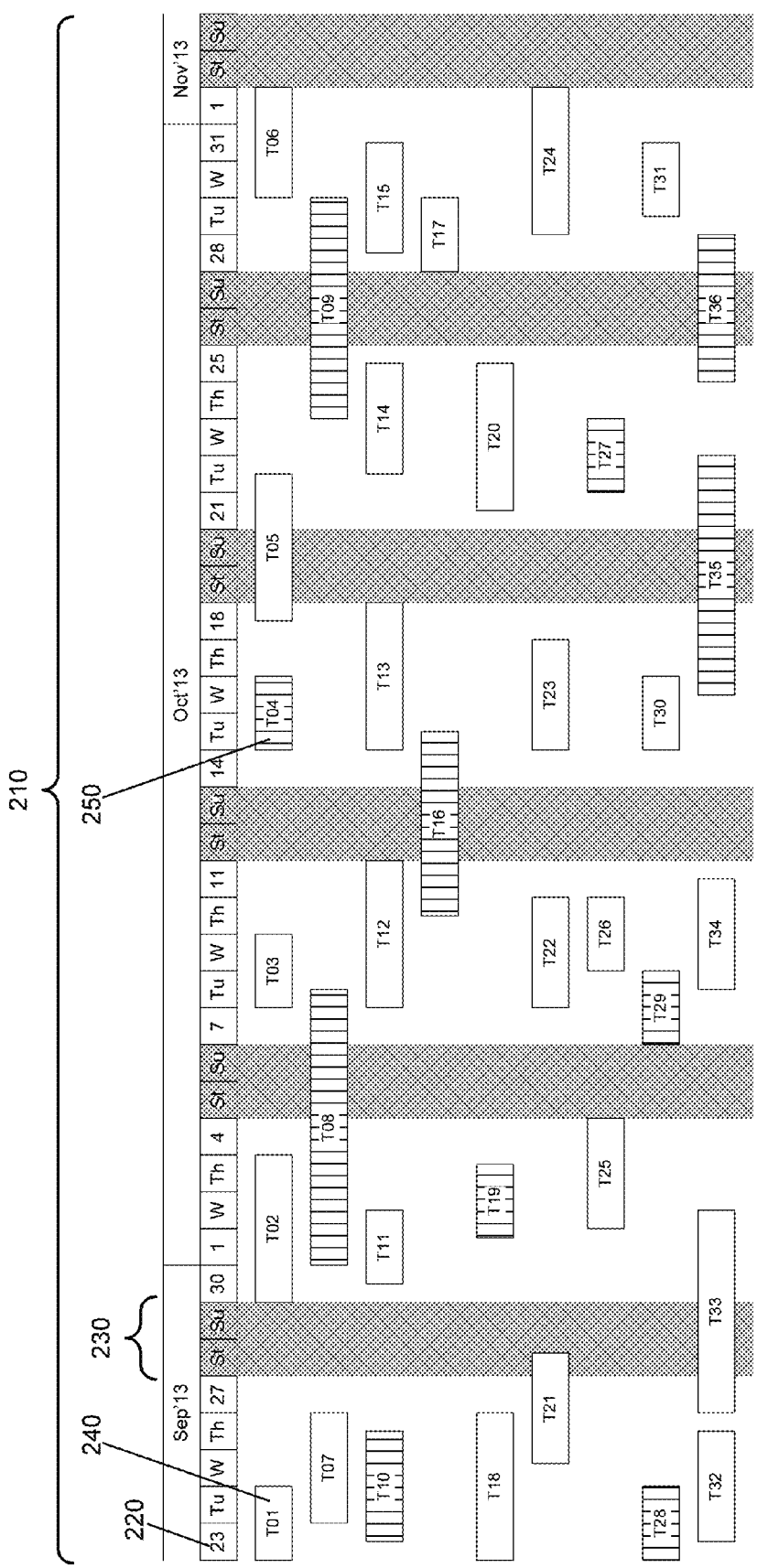
FIG. 2 illustrates a project plan timeline that is displayed by an automatic variable zooming system, according to an embodiment of the invention.

FIG. 2 illustrates a project plan timeline 210 that is displayed by an automatic variable zooming system, according to an embodiment of the invention. According to the embodiment, a user of the automatic variable zooming system can send an instruction to the automatic variable zooming system to open project plan timeline 210. The instruction can be sent using an interaction, such as moving a cursor over a tab, button, icon, or some other user interface element that is also displayed by the automatic variable zooming system. In response to the request, the automatic variable zooming system can display project plan timeline 210 within a user interface.

Project plan timeline 210 includes a timeline, where the timeline includes one or more time units 220. In the illustrated embodiment, each time unit 220 of project plan timeline 210 represents a day. Thus, time units 220 represents a plurality of days from Monday, Sep. 23, 2013 to Sunday, Nov. 3, 2013. However, this is only an example embodiment. In alternate embodiments, each time unit of a project plan timeline can represent any period of time (such as a second, a minute, an hour, a week, a month, a year, etc.). Further, in alternate embodiments, the one or more time units of a project plan timeline can collectively represent any period of time. Project plan timeline 210 can further display weekends 230, where a weekend is a specific type of time unit, using an alternate display format, such as a cross-hatched shaded format. While in the illustrated embodiment, time units 220 of project plan timeline 210 are displayed in a horizontal direction, in alternate embodiments, time units 220 of project plan timeline can be displayed in a vertical direction.

Project plan timeline 210 further includes one or more tasks, where the one or more tasks are displayed over the timeline. In the illustrated embodiment, project plan timeline 210 includes normal priority tasks 240 that are assigned a normal priority, and also includes high priority tasks 250 that are assigned a high priority. Normal priority tasks 240 can be displayed in a first display format (e.g., clear format), and high priority tasks 250 can be displayed in a second display format (e.g., striped format). In the illustrated embodiment, normal high priority tasks 240 include tasks T01, T02, T03, T05, T06, T07, T11, T12, T13, T14, T15, T17, T18, T20, T21, T22, T23, T24, T25, T26, T30, T31, T32, T33, and T34. Further, high priority tasks 250 include tasks T04, T08, T09, T10, T16, T19, T27, T28, T29, T35, and T36. While in the illustrated embodiment, the one or more tasks are displayed over the timeline in a horizontal direction, in alternate embodiments, the one or more tasks can be displayed in a vertical direction.

Figure 3:
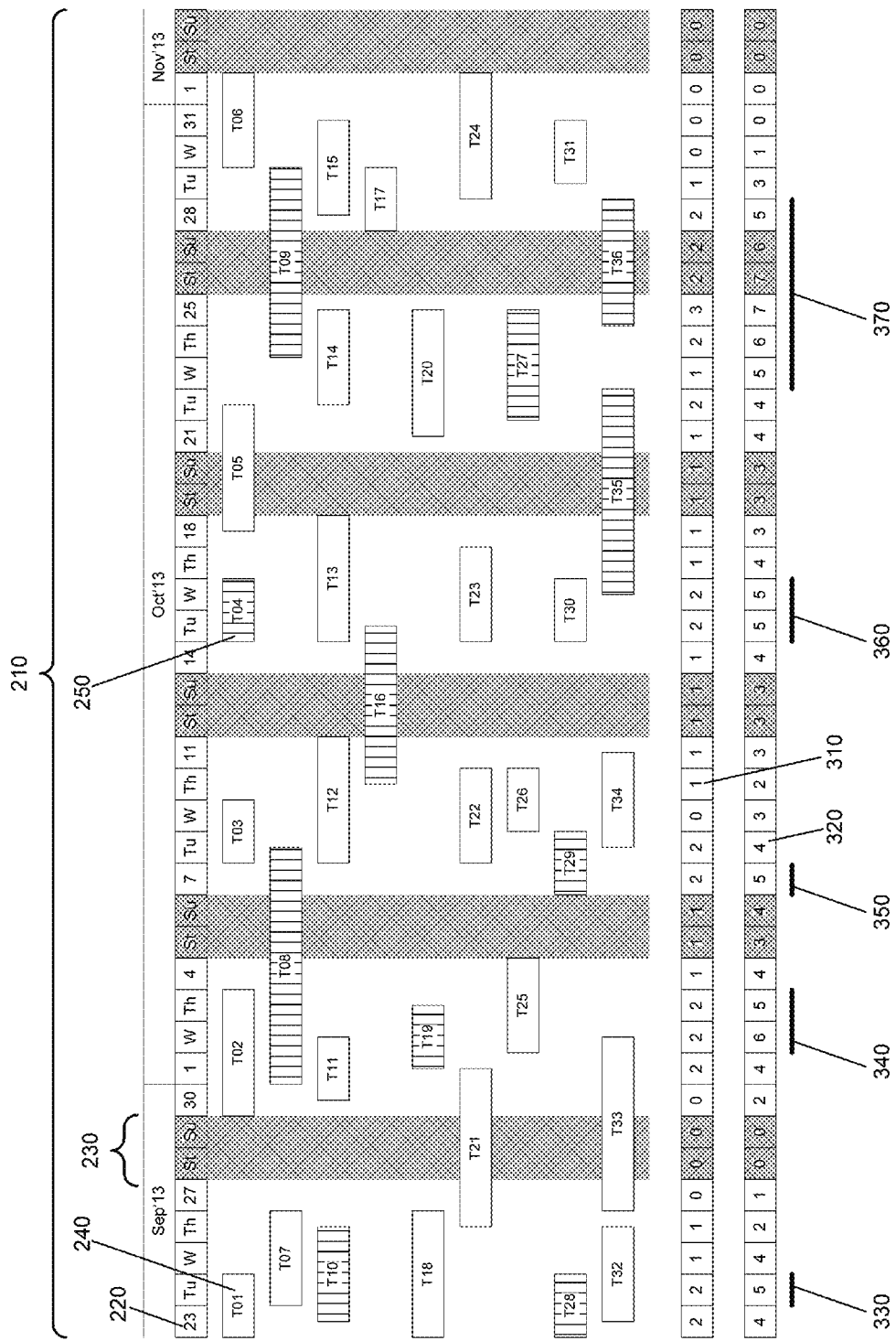
FIG. 3 illustrates variable zoom calculation scores that are calculated based on a criteria for a project plan timeline, according to an embodiment of the invention.

FIG. 3 illustrates variable zoom calculation scores that are calculated based on a criteria for project plan timeline 210, according to an embodiment of the invention. According to the embodiment, a user can send an instruction to the automatic variable zooming system to invoke automatic variable zooming on project plan timeline 210. The instruction can be sent using an interaction, such as moving a cursor over a tab, button, icon, or some other user interface element. In response to the instruction to invoke automatic variable zooming, the automatic variable zooming system can request that the user define a criteria to be used for the automatic variable zooming. According to the embodiment, a criteria is a metric of project plan timeline 210 that can be utilized by the automatic variable zooming system to calculate one or more scores for time units 220 of project plan timeline 210, as is described below in greater detail. Examples of criteria that can be used for automatic variable zooming include: (a) a total number of tasks per time unit; (b) a total number of "high priority" tasks (i.e., tasks that are assigned a high priority) per time unit; (c) a total number of "milestone" tasks (i.e., tasks that are defined as a "milestone" for a project plan timeline) per time unit; (d) a total number of tasks assigned to a resource per time unit; (e) a total number of resources who are over-allocated per time unit; or (f) a total number of resources having an unallocated capacity per time unit. However, these are only examples of criteria that can be used for automatic variable zooming, and in alternate embodiments, an alternate criteria can be used. In certain embodiments, the automatic variable zooming system can define, in advance, a set of criteria, and the user can select the criteria from the set of pre-defined criteria. In other embodiments, the criteria can be defined by the user. In the illustrated embodiment, the criteria that is used for automatic variable zooming is a total number of high priority tasks per time unit.

According to the embodiment, based on the criteria that is selected, the automatic variable zooming system calculates variable zoom calculation scores for time units 220 of project plan timeline 210. More specifically, the automatic variable zooming system calculates raw scores 310 for time units 220 of project plan timeline 210 based on the selected criteria. By calculating a raw score for a time unit, the automatic variable zooming system can calculate a numerical value that represents the selected criteria for the time unit. For example, in the illustrated embodiment, the automatic variable zooming system can calculate raw scores 310 for time units 220 of project plan timeline 210, where each raw score is a numerical value that represents a number of high priority tasks for a corresponding time unit of time units 220.

Thus, as an example, a raw score 310 for a time unit 220 that represents Monday, Sep. 23, 2013 is 2, which represents a number of high priority tasks (i.e., tasks T10 and T28) that occur on Monday, Sep. 23, 2013. Similarly, a raw score 310 for a time unit 220 that represents Tuesday, Sep. 24, 2013 is 2, which represents a number of high priority tasks (i.e., tasks T10 and T28) that occur on Tuesday, Sep. 24, 2013. In contrast, a raw score 310 for a time unit 220 that represents Wednesday, Sep. 25, 2013 is 1, which represents a number of high priority tasks (i.e., task T28) that occur on Wednesday Sep. 25, 2013. Thus, raw scores 310 are calculated for time units 220 that represent Monday, Sep. 23, 2013 to Sunday, Nov. 3, 2013.

According to the embodiment, the automatic variable zooming system further calculates range scores 320 for time units 220 of project plan timeline 210. A range score can be calculated according to the following formula: $R_{(n)} = S_{(n-1)} + S_{(n)} + S_{(n+1)}$, where $R_{(n)}$ represents a range score for a $n^{th}$ time unit, $S_{(n)}$ represents a raw score for a $n^{th}$ time unit, $S_{(n-1)}$ represents a raw score for a $(n-1)^{th}$ time unit, and $S_{(n+1)}$ represents a raw score for a $(n+1)^{th}$ time unit. Thus, in other words, a range score for a time unit can be a sum of a raw score for the time unit, a raw score for a previous time unit and a raw score for a subsequent time unit. In alternate embodiments, instead of using three terms to calculate a range score, the automatic variable zooming system can use any number of terms, such as five, seven, or more, to calculate the range score.

Thus, as an example, a range score 320 for a time unit 220 that represents Monday, Sep. 23, 2013 is 4, which represents a sum of a raw score for the time unit (i.e., 2), a raw score for a previous time unit (i.e., 0, because there is no previous time unit), and a raw score for a subsequent time unit (i.e., 2, which is the raw score for the time unit that represents Tuesday, Sep. 24, 2013). Further, a range score 320 for a time unit 220 that represents Tuesday, Sep. 24, 2013 is 5, which represents a sum of a raw score for the time unit (i.e., 2), a raw score for a previous time unit (i.e., 2, which is the raw score for the time unit that represents Monday, Sep. 23, 2013), and a raw score for a subsequent time unit (i.e., 1, which is the raw score for the time unit that represents Wednesday, Sep. 25, 2013). Further, a range score 320 for a time unit 220 that represents Wednesday, Sep. 25, 2013 is 4, which represents a sum of a raw score for the time unit (i.e., 1), a raw score for a previous time unit (i.e., 2, which is the raw score for the time unit that represents Tuesday, Sep. 24, 2013), and a raw score for a subsequent time unit (i.e., 1, which is the raw score for the time unit that represents Thursday, Sep. 26, 2013). Thus, range scores 320 are calculated for time units 220 that represent Monday, Sep. 23, 2013 to Sunday, Nov. 3, 2013.

According to the embodiment, the automatic variable zooming system further selects a number of time units 220 which have the highest range scores. In other words, the automatic variable zooming system selects a number of time units 220 that correspond to range scores 320 that are the highest range scores. The selection of the range scores 320 that are the highest range scores is based on a "range score cut-off." A "range score cut-off" is a cut-off value for range scores 320 that is automatically determined by the automatic variable zooming system in order to result in the automatic variable zooming system only selecting a number of time units 220 that is a fraction of a total number of time units 220 (i.e., $f_{(selected)}$). Thus, the automatic variable zooming system can require that a range score of range scores 320 have a numeric value greater than or equal to the range score cut-off before the range score (and thus, the corresponding time unit) is selected. Further, in certain embodiments, $f_{(selected)}$ can be substantially equal to $1/(1+SF)*TOTAL$, where SF represents a skew factor defined by the automatic variable zooming system, and where TOTAL represents the total number of time units 220. By being "substantially equal" to $1/(1+SF)*TOTAL$, what is meant is that $f_{(selected)}$ is the largest possible fraction that is less than or equal to $1/(1+SF)*TOTAL$. Further, as described below in greater detail, a skew factor controls a zoom-in factor used by the automatic variable zooming system to adjust a zoom level for portions of project plan timeline 210, and also controls a zoom-out factor used by the automatic variable zooming system to adjust a zoom level for other portions of project plan timeline 210. In alternate embodiments, the skew factor can be defined by the user rather than by the automatic variable zooming system.

According to the illustrated embodiment, a skew factor is defined as 2, and thus, $f_{(selected)}$ is substantially equal to ⅓ of the total number of time units 220, based on the formula $1/(1+SF)*TOTAL$. This is only an example fraction, and in alternate embodiments, $f_{(selected)}$ can be substantially equal to a different fraction based on a different skew factor. Further, in the illustrated embodiment, a total number of time units 220 is equal to 42, and a range score cut-off for range scores 320 is defined as 5, such that, the automatic variable zooming system selects 12 time units of time units 220 whose range score is 5 or greater, where the selected 12 time units are highlighted in FIG. 3 with dark bars 330, 340, 350, 360, and 370 at the bottom of project plan timeline 210. Thus, $f_{(selected)}$ (i.e., 12/42 or 2/7) is substantially equal to ⅓. If a range score cut-off had been defined as 4, then 22 time units of time units 220 would be selected, which would result in $f_{(selected)}$ (i.e., 22/42 or 11/21) being greater than ⅓. Further, if a range score cut-off had been defined as 6, only 5 time units of time units 220 would be selected, which would result in $f_{(selected)}$ (i.e., 5/42) being less than ⅓, but also being less than $f_{(selected)}$ when the range score cut-off is defined as 5 (i.e., 2/7), and thus, would result in $f_{(selected)}$ not being the largest possible fraction that is less than or equal to $1/(1+SF)*TOTAL$.

Figure 4:
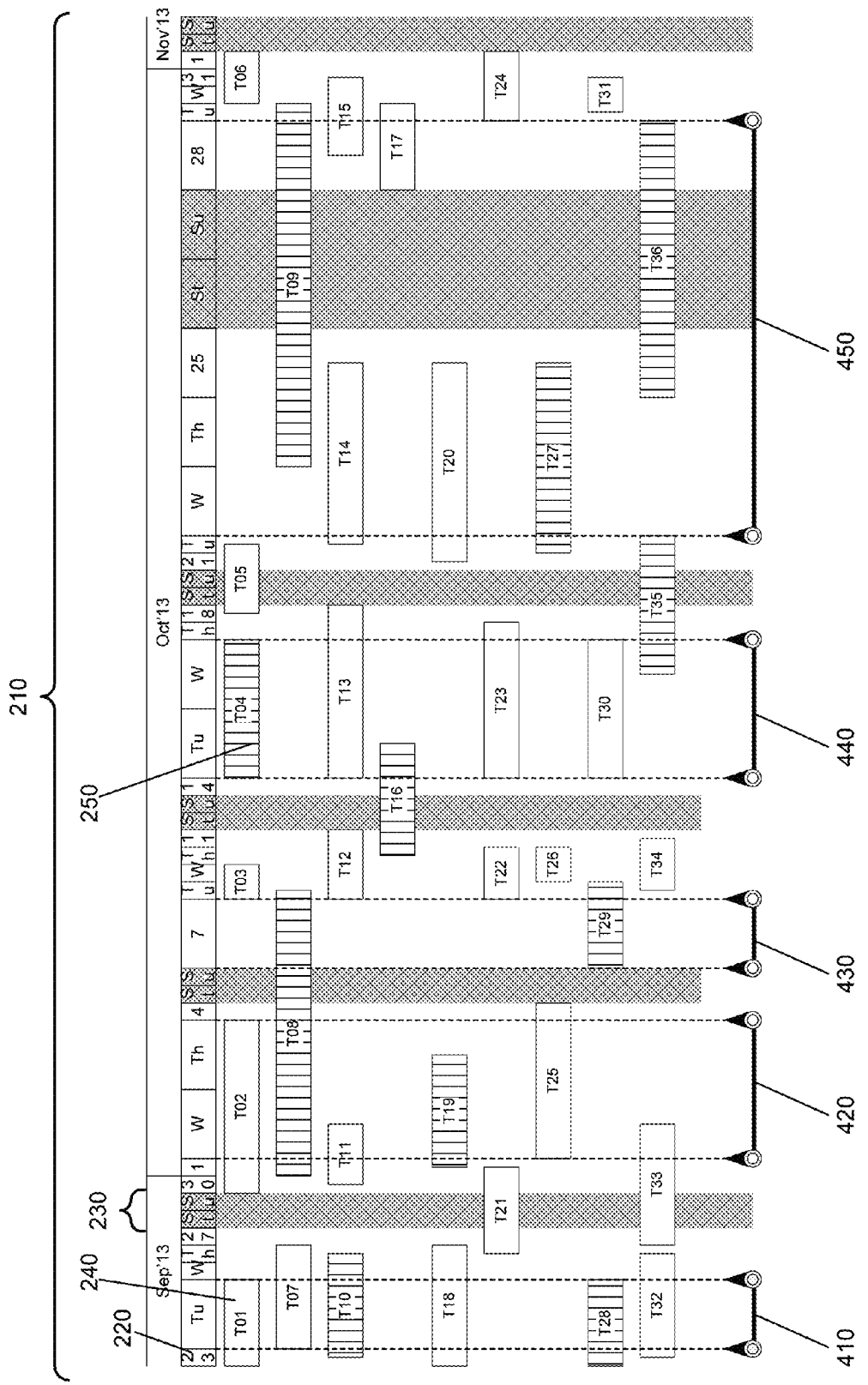
FIG. 4 illustrates an automatic variable zoom display of a project plan timeline that is displayed by an automatic variable zooming system, according to an embodiment of the invention.

FIG. 4 illustrates an automatic variable zoom display of project plan timeline 210 that is displayed by an automatic variable zooming system, according to an embodiment of the invention. According to the embodiment, the automatic variable zooming system first uniformly reduces a zoom level for time units 220 by a zoom-out factor (i.e., $f_{(zoom-out)}$). Further, in certain embodiments, $f_{(zoom-out)}$ can be equal to $1/SF$, where SF represents a skew factor defined by the automatic variable zooming system. As previously described, a skew factor controls a zoom-out factor used by the automatic variable zooming system to adjust a zoom level for portions of project plan timeline 210. In alternate embodiments, the skew factor can be defined by the user rather than by the automatic variable zooming system.

According to the illustrated embodiment, a skew factor is defined as 2, and thus, $f_{(zoom-out)}$ is equal to ½ or 0.5. This is only an example value, and in alternate embodiments, $f_{(zoom-out)}$ can be equal to a different value. Thus, the automatic variable zooming system reduces a zoom level of time units 220 by 2× (or in other words, adjusts a zoom level of time units 220 by 0.5×).

According to the embodiment, the automatic variable zooming system subsequently increases a zoom level for the 12 previously-selected time units of time units 220 by a zoom-in factor (i.e., $f_{(zoom-in)}$). Further, in certain embodiments, $f_{(zoom-in)}$ can be equal to SF, where SF represents a skew factor defined by the automatic variable zooming system. As previously described, a skew factor also controls a zoom-in factor used by the automatic variable zooming system to adjust a zoom level for portions of project plan timeline 210. In alternate embodiments, the skew factor can be defined by the user rather than by the automatic variable zooming system.

According to the illustrated embodiment, a skew factor is defined as 2, and thus, $f_{(zoom-in)}$ is equal to 2. This is only an example value, and in alternate embodiments, $f_{(zoom-in)}$ can be equal to a different value. Thus, the automatic variable zooming system increases a zoom level of the 12 previously-selected time units of time units 220 by 4× (or in other words, increases a zoom level of the 12 previously-selected time units of time units 220 by 2×, with respect to an original display zoom level).

Thus, ⅓ (or substantially ⅓) of the original display of project plan timeline 210 occupies ⅔ of a display area of the user interface of the automatic variable zooming system. Further, ⅔ (or substantially ⅔) of the original display of project plan timeline 210 occupies ⅓ of the display area of the user interface of the automatic variable zooming system. These display area proportions are based on the skew factor, and the display area proportions can be modified when the skew factor is modified. For example, a skew factor equal to 3 would result in $f_{(selected)}=¼$, $f_{(zoom-in)}=⅓$, and $f_{(zoom-out)}=3$. In this example, ¼ (or substantially ¼) of the original display of project plan timeline 210 occupies ¾ of a display area of the user interface of the automatic variable zooming system. Further, ¾ or (substantially ¾) of the original display of project plan timeline 210 occupies ¼ of the display area of the user interface of the automatic variable zooming system.

According to the embodiment, after adjusting the zoom levels for time units 220, the automatic variable zooming system displays markers 410, 420, 430, 440, and 450 within the user interface. Markers 410, 420, 430, 440, and 450 represent the zoomed-in portions of project plan timeline 210. A user can interact with markers 410, 420, 430, 440, and 450 to further customize a zoom level of the corresponding portions of project plan timeline 210. For example, a user can drag a horizontal edge of marker 410 in a horizontal direction using a cursor control, such as a mouse. As another example, a user can place a cursor on marker 410 and "click" on marker 410 using the cursor control. By customizing a zoom level of a portion of project plan timeline 210, a user can: (a) increase the zoom level of the portion; (b) reduce the zoom level of the portion; (c) increase a size of the portion to include more time units; or (d) reduce a size of the portion to include fewer time units. According to the embodiment, in response to a customization of a portion of project plan timeline 210 via an interaction with a marker of markers 410, 420, 430, 440, or 450, the automatic variable zooming system can automatically and proportionally adjust the zoom levels of the remaining portions of project plan timeline 210 so as to make a display area of the user interface optimally filled.

Further, in an embodiment, the automatic variable zooming system can adjust a zoom level for additional portions of project plan timeline 210, in response to an interaction by the user, such as moving a cursor over a tab, button, icon, or some other user interface element that is also displayed by the automatic variable zooming system. By doing so, the automatic variable zooming system can create additional markers (similar to markers 410, 420, 430, 440, and 450) that are displayed within the user interface. Further, the automatic variable zooming system can restore an original zoom level for portions of project plan timeline 210, in response to an interaction by the user, such as moving a cursor over a tab, button, icon, or some other user interface element. By doing so, the automatic variable zooming system can remove markers (such as markers 410, 420, 430, 440, and 450) from the user interface. Additionally, the automatic variable zooming system can restore original zoom levels for all portions of project plan timeline 210, in response to an interaction by the user, such as moving a cursor over a tab, button, icon, or some other user interface element. By doing so, the automatic variable zooming system can remove all markers (including markers 410, 420, 430, 440, and 450) from the user interface. In addition, the automatic variable zooming system can save the zoom levels of project plan timeline 210 as a variable zoom profile. The variable zoom profile can be stored, can be shared with other users, and can be subsequently loaded and applied to any project plan timeline.

Figure 5:
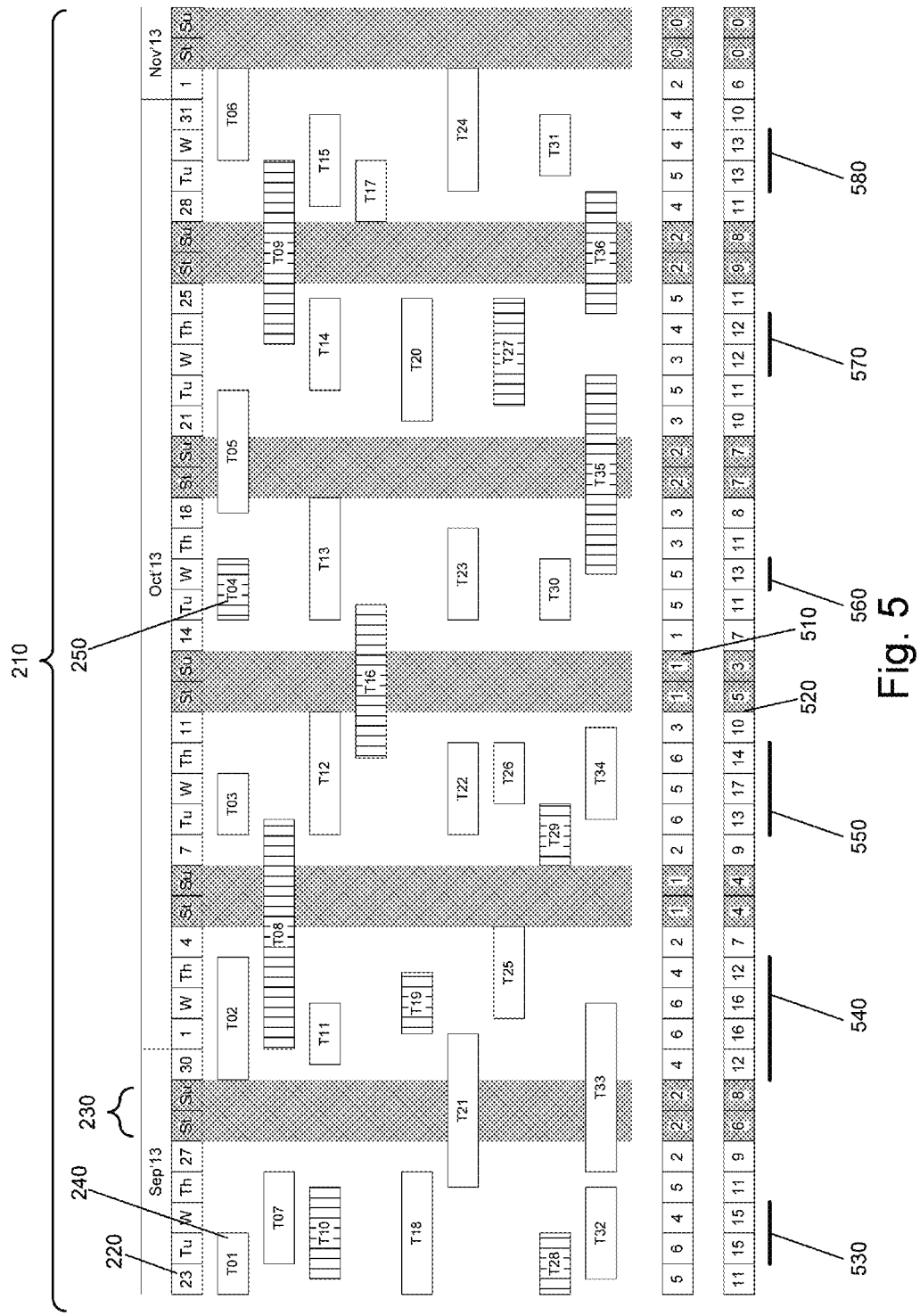
FIG. 5 illustrates variable zoom calculation scores that are calculated based on a different criteria for a project plan timeline, according to an embodiment of the invention.

FIG. 5 illustrates variable zoom calculation scores that are calculated based on a different criteria for project plan timeline 210, according to an embodiment of the invention. FIG. 5 is similar to FIG. 3, except that, in FIG. 5, the automatic variable zooming system utilizes a criteria that is a number of tasks (including both normal priority tasks 240 and high priority tasks 250) per time unit, instead of a criteria that is merely a number of high priority tasks per time unit.

According to the embodiment, a user can send an instruction to the automatic variable zooming system to invoke automatic variable zooming on project plan timeline 210. In response to the instruction to invoke automatic variable zooming, the automatic variable zooming system can request that the user define a criteria to be used for the automatic variable zooming. In the illustrated embodiment, as previously described, the criteria that is used for automatic variable zooming is a total number of tasks per time unit.

According to the embodiment, the automatic variable zooming system calculates raw scores 510 for time units 220 of project plan timeline 210 based on the selected criteria. For example, in the illustrated embodiment, the automatic variable zooming system can calculate raw scores 510 for time units 220 of project plan timeline 210, where each raw score is a numerical value that represents a number of tasks for a corresponding time unit of time units 220.

Thus, as an example, a raw score 510 for a time unit 220 that represents Monday, Sep. 23, 2013 is 5, which represents a number of tasks (i.e., tasks T01, T10, T18, T28 and T32) that occur on Monday, Sep. 23, 2013. Further, a raw score 510 for a time unit 220 that represents Tuesday, Sep. 24, 2013 is 6, which represents a number of tasks (i.e., tasks T01, T07, T10, T18, T28 and T32) that occur on Tuesday, Sep. 24, 2013. Additionally, a raw score 510 for a time unit 220 that represents Wednesday, Sep. 25, 2013 is 4, which represents a number of tasks (i.e., tasks T07, T10, T18, and T32) that occur on Wednesday Sep. 25, 2013. Thus, raw scores 510 are calculated for time units 220 that represent Monday, Sep. 23, 2013 to Sunday, Nov. 3, 2013.

According to the embodiment, the automatic variable zooming system further calculates range scores 520 for time units 220 of project plan timeline 210. As previously described, a range score can be calculated according to the following formula: $R_{(n)} = S_{(n-1)} + S_{(n)} + S_{(n+1)}$, where $R_{(n)}$ represents a range score for a $n^{th}$ time unit, $S_{(n)}$ represents a raw score for a $n^{th}$ time unit, $S_{(n-1)}$ represents a raw score for a $(n-1)^{th}$ time unit, and $S_{(n+1)}$ represents a raw score for a $(n+1)^{th}$ time unit. Thus, in other words, a range score for a time unit can be a sum of a raw score for the time unit, a raw score for a previous time unit and a raw score for a subsequent time unit.

Thus, as an example, a range score 520 for a time unit 220 that represents Monday, Sep. 23, 2013 is 11, which represents a sum of a raw score for the time unit (i.e., 5), a raw score for a previous time unit (i.e., 0, because there is no previous time unit), and a raw score for a subsequent time unit (i.e., 6, which is the raw score for the time unit that represents Tuesday, Sep. 24, 2013). Further, a range score 520 of a time unit 220 that represents Tuesday, Sep. 24, 2013 is 15, which represents a sum of a raw score for the time unit (i.e., 6), a raw score for a previous time unit (i.e., 5, which is the raw score for the time unit that represents Monday, Sep. 23, 2013), and a raw score for a subsequent time unit (i.e., 4, which is the raw score for the time unit that represents Wednesday, Sep. 25, 2013). Further, a range score 520 of a time unit 220 that represents Wednesday, Sep. 25, 2013 is 15, which represents a sum of a raw score for the time unit (i.e., 4), a raw score for a previous time unit (i.e., 6, which is the raw score for the time unit that represents Tuesday, Sep. 24, 2013), and a raw score for a subsequent time unit (i.e., 5, which is the raw score for the time unit that represents Thursday, Sep. 26, 2013). Thus, range scores 520 are calculated for time units 220 that represent Monday, Sep. 23, 2013 to Sunday, Nov. 3, 2013.

According to the embodiment, the automatic variable zooming system further selects a number of time units 220 which have the highest range scores. In other words, the automatic variable zooming system selects a number of time units 220 that correspond to range scores 520 that are the highest range scores. As previously described, the selection of the number of range scores 520 that are the highest range scores is based on a range score cut-off that is automatically determined by the automatic variable zooming system in order to result in the automatic variable zooming system only selecting a number of time units that is a fraction of a total number of time units 220 (i.e., $f_{(selected)}$). Further, as also previously described, in certain embodiments, $f_{(selected)}$ can be substantially equal to $1/(1+SF)*TOTAL$, where SF represents a skew factor defined by the automatic variable zooming system, and where TOTAL represents the total number of time units 220.

According to the illustrated embodiment, a skew factor is defined as 2, and thus, $f_{(selected)}$ is substantially equal to ⅓ of the total number of time units 220, based on the formula $1/(1+SF)*TOTAL$. Further, in the illustrated embodiment, a total number of time units 220 is equal to 42, and a range score cut-off for range scores 520 is defined as 12. Thus, the automatic variable zooming system selects 14 time units of time units 220 whose range score is 3 or greater, where the selected 14 time units are highlighted in FIG. 5 with dark bars at the bottom of project plan timeline 210. Thus, $f_{(selected)}$ (i.e., 14/42 or ⅓) is substantially equal (in fact, exactly equal) to ⅓. If a range score cut-off had been defined as 11, then 21 time units of time units 220 would be selected, which would result in $f_{(selected)}$ (i.e., 21/42 or ½) being greater than ⅓. Further, if a range score cut-off had been defined as 13, only 10 time units of time units 220 would be selected, which would result in $f_{(selected)}$ (i.e., 10/42 or 5/21) being less than ⅓, but also being less than $f_{(selected)}$ when the range score cut-off is defined as 12 (i.e., ⅓), and thus, would result in $f_{(selected)}$ not being the largest possible fraction that is less than or equal to 1/(1+SF)*TOTAL.

Figure 6:
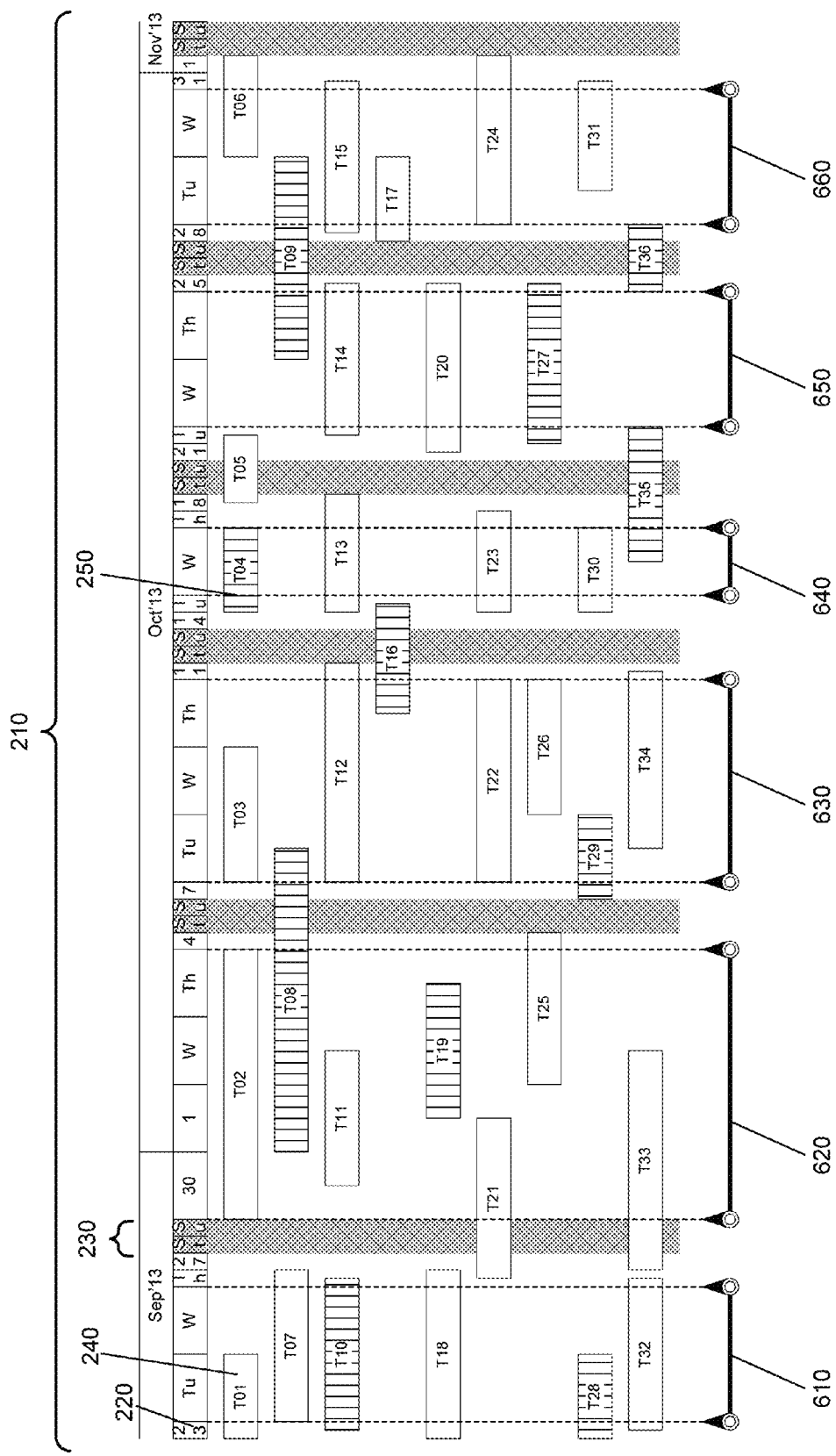
FIG. 6 illustrates another automatic variable zoom display of a project plan timeline that is displayed by an automatic variable zooming system, according to an embodiment of the invention.

FIG. 6 illustrates another automatic variable zoom display of project plan timeline 210 that is displayed by an automatic variable zooming system, according to an embodiment of the invention. FIG. 6 is similar to FIG. 4, except that, in FIG. 6, the automatic variable zooming system utilizes a criteria that is a number of tasks (including both normal priority tasks 240 and high priority tasks 250) per time unit, instead of a criteria that is merely a number of high priority tasks per time unit.

According to the embodiment, the automatic variable zooming system first uniformly reduces a zoom level for time units 220 by a zoom-out factor (i.e., $f_{(zoom-out)}$). Further, in certain embodiments, $f_{(zoom-out)}$ can be equal to 1/SF, where SF represents a skew factor defined by the automatic variable zooming system.

According to the illustrated embodiment, a skew factor is defined as 2, and thus, $f_{(zoom-out)}$ is equal to ½ or 0.5. Thus, the automatic variable zooming system reduces a zoom level of time units 220 by 2× (or in other words, adjusts a zoom level of time units 220 by 0.5×).

According to the embodiment, the automatic variable zooming system subsequently increases a zoom level for the 14 previously-selected time units of time units 220 by a zoom-in factor (i.e., $f_{(zoom-in)}$). Further, in certain embodiments, $f_{(zoom-in)}$ can be equal to SF, where SF represents a skew factor defined by the automatic variable zooming system.

According to the illustrated embodiment, a skew factor is defined as 2, and thus, $f_{(zoom-in)}$ is equal to 2. Thus, the automatic variable zooming system increases a zoom level of the 14 previously-selected time units of time units 220 by 4× (or in other words, increases a zoom level of the 14 previously-selected time units of time units 220 by 2×, with respect to an original display zoom level).

Thus, ⅓ (or substantially ⅓) of the original display of project plan timeline 210 occupies ⅔ of a display area of the user interface of the automatic variable zooming system. Further, ⅔ (or substantially ⅔) of the original display of project plan timeline 210 occupies ⅓ of the display area of the user interface of the automatic variable zooming system.

According to the embodiment, after adjusting the zoom levels for time units 220, the automatic variable zooming system displays markers 610, 620, 630, 640, 650, and 660 within the user interface. Markers 610, 620, 630, 640, 650, and 660 represent the zoomed-in portions of project plan timeline 210. A user can interact with markers 610, 620, 630, 640, 650, and 660 to further customize a zoom level of the corresponding portions of project plan timeline 210.

Figure 7:
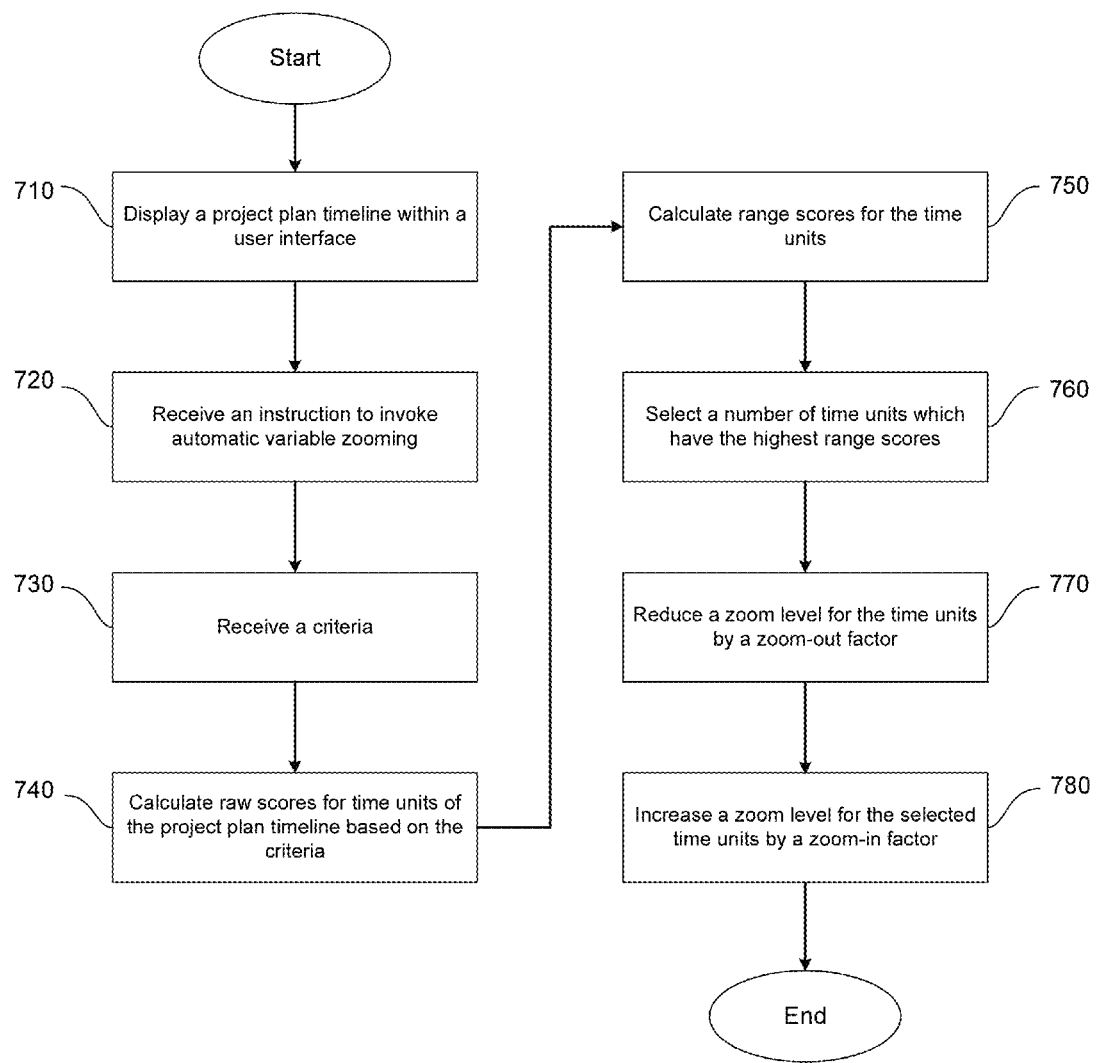
FIG. 7 illustrates a flow diagram of the functionality of an automatic variable zooming module, according to an embodiment of the invention.
Figure 8:
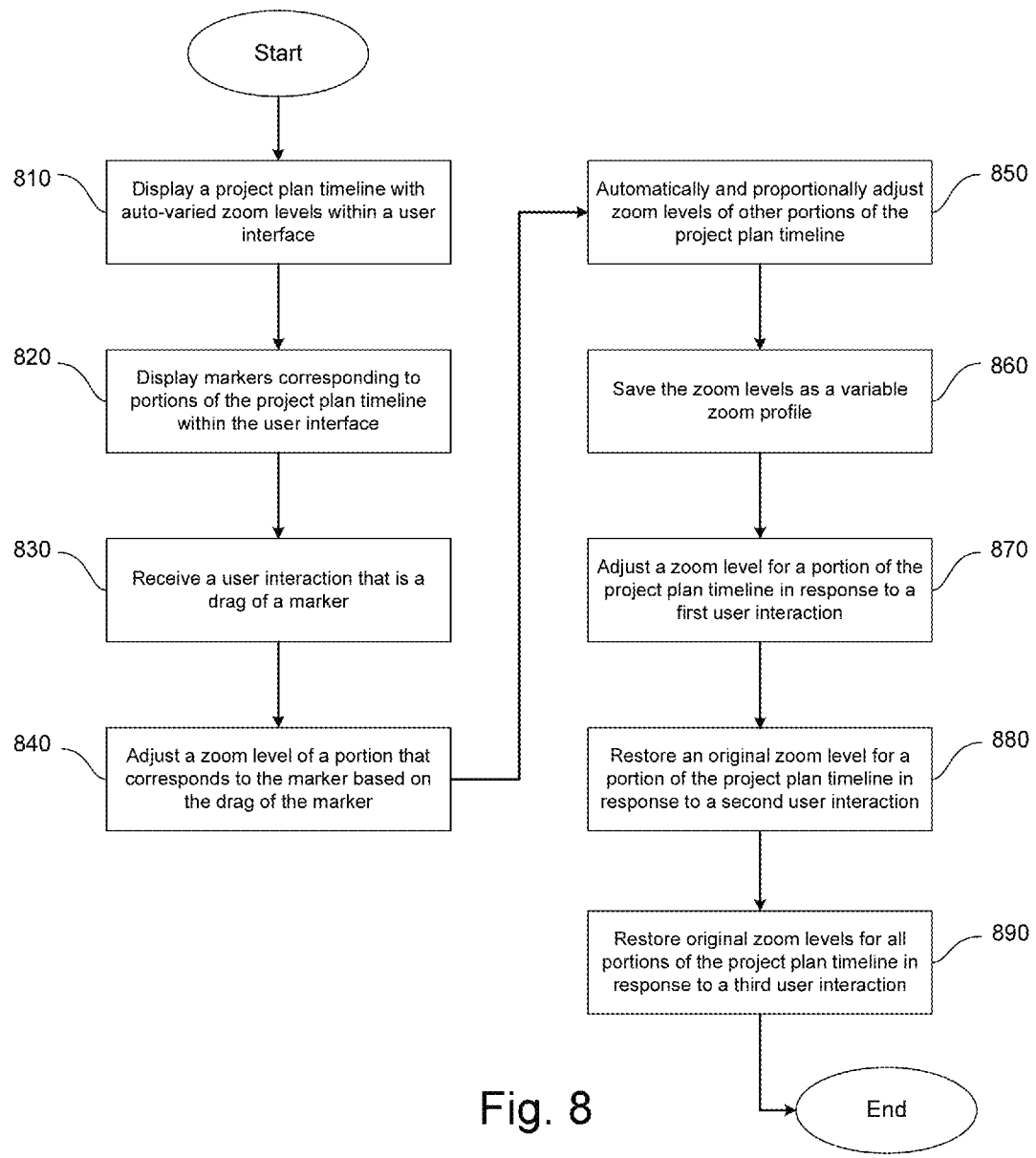
FIG. 8 illustrates a flow diagram of the functionality of an automatic variable zooming module, according to another embodiment of the invention.

FIG. 7 illustrates a flow diagram of the functionality of an automatic variable zooming module (such as automatic variable zooming module 16 of FIG. 1), according to an embodiment of the invention. In one embodiment, the functionality of the flow diagram of FIG. 7, as well as the functionality of the flow diagram of FIG. 8, are each implemented by software stored in a memory or some other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins, and proceeds to 710. At 710, a project plan timeline is displayed within a user interface. The project plan timeline includes one or more tasks and a timeline. The timeline includes one or more time units. In certain embodiments, a time unit can be a day. In certain embodiments, the one more tasks can be displayed over the timeline within the user interface. The flow then proceeds to 720.

At 720, an instruction to invoke automatic variable zooming on the displayed project plan timeline is received. The instruction can be sent using an interaction, such as moving a cursor over a tab, button, icon, or a user interface element. The flow then proceeds to 730.

At 730, a criteria is received. In certain embodiments, the criteria can be selected from a set of pre-defined criteria. The pre-defined criteria can include at least one of: a total number of tasks per time unit; a total number of high priority tasks per time unit; a total number of milestone tasks per time unit; a total number of tasks assigned to a resource per time unit; a total number of resources who are over-allocated per time unit; or a total number of resources having an unallocated capacity per time unit. In other embodiments, the criteria can be defined by a user. The flow then proceeds to 740.

At 740, one or more raw scores are calculated for the one or more time units of the project plan timeline based on the criteria. In certain embodiments, the calculating the one or more raw scores for the one or more time units can include calculating one or more numerical values that represent the selected criteria for the one or more time units. The flow then proceeds to 750.

At 750, one or more ranges scores are calculated for the one or more time units of the project plan timeline. In certain embodiments, a range score for a time unit can be a sum of a raw score for the time unit, a raw score for a previous time unit, and a raw score of a subsequent time unit. The flow then proceeds to 760.

At 760, a number of time units of the project plan timeline are selected which have the highest range scores. In certain embodiments, a skew factor ("SF") can be defined, and the number of time units that are selected can be substantially equal to 1/(1+SF)*a total number of the one or more time units of the project plan timeline. The flow then proceeds to 770.

At 770, a zoom level is reduced for the one or more time units of the project plan timeline by a zoom-out factor. In certain embodiments where SF is defined, the zoom-out factor can be equal to 1/SF. The flow then proceeds to 780.

At 780, a zoom level is increased for the selected time units of the project plan timeline by a zoom-in factor. In certain embodiments where SF is defined, the zoom-in factor can be equal to SF. The flow then ends.

FIG. 8 illustrates a flow diagram of the functionality of an automatic variable zooming module (such as automatic variable zooming module 16 of FIG. 1), according to another embodiment of the invention. The flow begins and proceeds to 810. At 810, a project plan timeline with auto-varied zoom levels is displayed within a user interface. In certain embodiments, the project plan timeline with auto-varied zoom levels can be displayed according to the functionality described in conjunction with FIG. 7. The flow then proceeds to 820.

At 820, one or more markers corresponding to one or more portions of the project plan timeline are displayed within the user interface. The flow then proceeds to 830.

At 830, a user interaction that is a drag of a marker of the one or more markers is received. The flow then proceeds to 840.

At 840, a zoom level of a portion that corresponds to the marker is adjusted based on the drag of the marker. The flow then proceeds to 850.

At 850, zoom levels of other portions of the project plan timeline are automatically and proportionally adjusted. The flow then proceeds to 860.

At 860, the zoom levels of the project plan timeline are saved as a variable zoom profile. The flow then proceeds to 870.

At 870, a zoom level is adjusted for an additional portion of the project plan timeline in response to a user interaction. The flow then proceeds to 880.

At 880, an original zoom level is restored for a portion of the project plan timeline in response to a user interaction. The flow then proceeds to 890.

At 890, original zoom levels are restored for all portions of the project plan timeline in response to a user interaction. The flow then ends.

Thus, an automatic variable zooming system is provided, that can provide automatic variable zooming of a project plan timeline that is displayed within a user interface. By providing automatic variable zooming, the automatic variable zooming system can display an entire project plan timeline within a display area, where "hot spots" are automatically zoomed-in. By displaying the entire project timeline, the automatic variable zooming can preserve an overall context of the project plan timeline, which still displaying "important" information in a legible manner.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to provide automatic variable zooming, the zooming comprising:
displaying a project plan timeline within a user interface, wherein a project plan timeline comprises one or more tasks and a timeline comprising one or more time units;
receiving an instruction to invoke automatic variable zooming on the displayed project plan timeline;
receiving a criteria;
calculating one or more scores for the one or more time units of the project plan timeline based on the criteria; and
adjusting a zoom level for one or more portions of the project plan timeline based on the one or more calculated scores;
wherein at least a section of the project plan timeline other than the one or more portions remains visible within the user interface after adjusting the zoom level for the one or more portions of the project plan timeline.

2. The computer-readable medium of claim 1, the zooming further comprising:
displaying one or more markers corresponding to the one or more portions of the project plan timeline within the user interface;
receiving a user interaction that comprises a drag of a marker of the one or more markers;
adjusting a zoom level of a portion of the project plan timeline that corresponds to the marker based on the drag of the marker; and
automatically and proportionally adjusting zoom levels of other portions of the project plan timeline.

3. The computer-readable medium of claim 1, the zooming further comprising saving the one or more zoom levels of the project plan timeline as a variable zoom profile.

4. The computer-readable medium of claim 1, the zooming further comprising adjusting a zoom level for an additional portion of the project plan timeline in response to a user interaction.

5. The computer-readable medium of claim 1, the zooming further comprising restoring an original zoom level for a portion of the project plan timeline in response to a user interaction.

6. The computer-readable medium of claim 1, the zooming further comprising restoring original zoom levels for all portions of the project plan timeline in response to a user interaction.

7. The computer-readable medium of claim 1, wherein the criteria is selected from a set of pre-defined criteria.

8. The computer-readable medium of claim 7, wherein the set of pre-defined criteria comprises at least one of: a total number of tasks per time unit; a total number of high priority tasks per time unit; a total number of milestone tasks per time unit; a total number of tasks assigned to a resource per time unit; a total number of resources who are over-allocated per time unit; or a total number of resources having an unallocated capacity per time unit.

9. The computer-readable medium of claim 1, wherein the criteria is defined by a user.

10. The computer-readable medium of claim 1, wherein the calculating the one or more scores for the one or more time units of the project plan timeline further comprises:
calculating one or more raw scores for the one or more time units of the project plan timeline based on the criteria;
calculating one or more range scores for the one or more time units of the project plan timeline, wherein a range score for a time unit comprises a sum of a raw score for the time unit, a raw score for a previous time unit and a raw score for a subsequent time unit; and
wherein the adjusting the zoom level for the one or more portions of the project plan timeline further comprises adjusting the zoom level for the one or more portions of the project plan timeline based on the one or more calculated range scores.

11. The computer-readable medium of claim 10, wherein the adjusting the zoom level for the one or more portions of the project plan timeline based on the one or more calculated range scores further comprises:
- selecting a number of time units of the project plan timeline which have the highest range scores;
- reducing a zoom level for the one or more time units of the project plan timeline by a zoom-out factor; and
- increasing a zoom level for the selected time units of the project plan timeline by a zoom-in factor.

12. The computer-readable medium of claim 11,
wherein a skew factor ("SF") is defined;
wherein the number of time units that are selected is substantially equal to 1/(1+SF)*a total number of the one or more time units of the project plan timeline;
wherein the zoom-out factor is equal to 1/SF; and
wherein the zoom-in factor is equal to SF.

13. A computer-implemented method for providing automatic variable zooming, the computer-implemented method comprising:
- displaying a project plan timeline within a user interface, wherein a project plan timeline comprises one or more tasks and a timeline comprising one or more time units;
- receiving an instruction to invoke automatic variable zooming on the displayed project plan timeline;
- receiving a criteria;
- calculating one or more scores for the one or more time units of the project plan timeline based on the criteria; and
- adjusting a zoom level for one or more portions of the project plan timeline based on the one or more calculated scores;
- wherein at least a section of the project plan timeline other than the one or more portions remains visible within the user interface after adjusting the zoom level for the one or more portions of the project plan timeline.

14. The computer-implemented method of claim 13, further comprising:
- displaying one or more markers corresponding to the one or more portions of the project plan timeline within the user interface;
- receiving a user interaction that comprises a drag of a marker of the one or more markers;
- adjusting the zoom level of a portion of the project plan timeline that corresponds to the marker based on the drag of the marker;
- automatically and proportionally adjusting zoom levels of other portions of the project plan timeline.

15. The computer-implemented method of claim 13, wherein the calculating the one or more scores for the one or more time units of the project plan timeline further comprises:
- calculating one or more raw scores for the one or more time units of the project plan timeline based on the criteria;
- calculating one or more range scores for the one or more time units of the project plan timeline, wherein a range score for a time unit comprises a sum of a raw score for the time unit, a raw score for a previous time unit and a raw score for a subsequent time unit; and
- wherein the adjusting the zoom level for the one or more portions of the project plan timeline further comprises adjusting the zoom level for the one or more portions of the project plan timeline based on the one or more calculated range scores.

16. The computer-implemented method of claim 15, wherein the adjusting the zoom level for the one or more portions of the project plan timeline based on the one or more calculated range scores further comprises:
- selecting a number of time units of the project plan timeline which have the highest range scores;
- reducing a zoom level for the one or more time units of the project plan timeline by a zoom-out factor; and
- increasing a zoom level for the selected time units of the project plan timeline by a zoom-in factor.

17. The computer-implemented method of claim 16,
wherein a skew factor ("SF") is defined;
wherein the number of time units that are selected is substantially equal to 1/(1+SF)*a total number of the one or more time units of the project plan timeline;
wherein the zoom-out factor is equal to 1/SF; and
wherein the zoom-in factor is equal to SF.

18. A system for providing automatic variable zooming, the system comprising:
- a project plan timeline display module configured to display a project plan timeline within a user interface, wherein a project plan timeline comprises one or more tasks and a timeline comprising one or more time units;
- an instruction receiving module configured to receive an instruction to invoke automatic variable zooming on the displayed project plan timeline;
- a criteria receiving module configured to receive a criteria;
- a score calculation module configured to calculate one or more scores for the one or more time units of the project plan timeline based on the criteria; and
- a zoom level adjustment module configured to adjust a zoom level for one or more portions of the project plan timeline based on the one or more calculated scores;
- wherein at least a section of the project plan timeline other than the one or more portions remains visible within the user interface after adjusting the zoom level for the one or more portions of the project plan timeline.

19. The system of claim 18,
wherein the score calculation module is further configured to calculate one or more raw scores for the one or more time units of the project plan timeline based on the criteria;
wherein the score calculation module is further configured to calculate one or more range scores for the one or more time units of the project plan timeline, wherein a range score for a time unit comprises a sum of a raw score for the time unit, a raw score for a previous time unit and a raw score for a subsequent time unit; and
wherein the zoom level adjustment module is further configured to adjust the zoom level for the one or more portions of the project plan timeline based on the one or more calculated range scores.

20. The system of claim 19,
wherein the zoom level adjustment module is further configured to select a number of time units of the project plan timeline which have the highest range scores;
wherein the zoom level adjustment module is further configured to reduce a zoom level for the one or more time units of the project plan timeline by a zoom-out factor; and
wherein the zoom level adjustment module is further configured to increase a zoom level for the selected time units of the project plan timeline by a zoom-in factor.

* * * * *